United States Patent

Allen et al.

[15] 3,638,727
[45] Feb. 1, 1972

[54] METHOD OF TREATING A SUBTERRANEAN HYDROCARBON-BEARING FORMATION

[72] Inventors: Joseph C. Allen, Bellaire, Tex.; Charles L. Bauer, New York, N.Y.

[73] Assignee: Texaco Inc., New York, N.Y.

[22] Filed: Sept. 27, 1968

[21] Appl. No.: 786,791

[52] U.S. Cl. ..................166/259, 166/260, 166/261, 166/262
[51] Int. Cl. ..........................E21b 43/24
[58] Field of Search..........166/259, 256, 260, 261, 262–263, 166/308, 302

[56] References Cited

UNITED STATES PATENTS

| | | | |
|---|---|---|---|
| 2,962,095 | 11/1960 | Morse | 166/259 |
| 3,010,513 | 11/1961 | Gerner | 166/259 |
| 3,366,176 | 1/1968 | Parrish | 166/259 |
| 3,376,929 | 4/1968 | Hagedorn | 166/260 X |

*Primary Examiner*—Stephen J. Novosad
*Attorney*—K. E. Kavanagh and Thomas H. Whaley

[57] ABSTRACT

Improved treatment of a subterranean hydrocarbon-bearing formation is effected by fracturing the formation using a fracturing mixture composed of a hydrocarbon liquid containing, in addition to a particulate propping agent, finely suspended charcoal, whereby additional fracturing is attained after a conventional fracturing procedure by in situ combustion of the fracturing mixture, and thereafter quenching the combustion with water.

4 Claims, No Drawings

# 3,638,727

METHOD OF TREATING A SUBTERRANEAN HYDROCARBON-BEARING FORMATION

FIELD OF THE INVENTION

This invention relates to an improved method for treatment of a subterranean hydrocarbon-bearing formation leading to increased recovery of hydrocarbons therefrom. More particularly, this invention relates to a method whereby stimulation of a subterranean hydrocarbon-bearing formation is realized by subjecting the formation to a conventional hydraulic fracturing operation, effecting in situ combustion of the fracturing mixture, and thereafter quenching the combustion with water.

DESCRIPTION OF THE PRIOR ART

In the production of hydrocarbons from subterranean formations, one of the methods used to stimulate production is that of fracturing the subterranean formation whereby artificial fractures or cleavage planes are formed extending from the well bore into the hydrocarbon-bearing formation. These cleavage planes increase the permeability and porosity of the formation and thus provide flow channels which enhance the production of hydrocarbons.

The most commonly used procedure to induce fracturing is high-pressure hydraulic fracturing. In that process, a fluid is displaced down a well bore and into contact with the hydrocarbon-bearing formation at a rate higher than that at which the fluid can flow into and through the formation. On continued injection of the fluid, the pressure within the well bore increases to a pressure at which the formation breaks down to create one or more fractures extending outwardly from the well bore into the formation. Hydraulic fracturing fluids generally consist of aqueous liquids, hydrocarbon oils, or oil-water emulsions, to which propping agents, viscosity thickeners, or other additives have been added.

Usually, after the artificial fractures have been created around a well bore within a hydrocarbon-bearing formation, the solid particulate propping agents are caused to flow into the fracture and function to hold the fracture at least partially open after release of fracturing pressure on the fluid in the well bore and in the fracture and thereby provide a high-capacity flow conduit to improve the fluid conductivities of the formation. While sand is the usual propping agent used for maintaining passages or channels within the fracture leading to the well bore, other particulate materials such as metal shot, glass beads, and plastics, which have a high compressive strength, are used also.

Another technological advance in the petroleum industry is the development of secondary recovery methods to increase the ultimate recovery of hydrocarbons from subterranean formations. Among the newer techniques used are thermal methods, including in situ combustion. Briefly, this method involves initiating a combustion of part of the hydrocarbons in the formation and thereafter maintaining the in situ combustion by the continuous injection of a combustion-supporting gas, such as air, which burns pat of the hydrocarbons, thereby providing thermal energy for the displacement of the remainder of the hydrocarbons toward a production well, whence it is produced.

In accordance with the present invention, it is an object thereof to provide an improved method for treatment of a subterranean hydrocarbon-bearing formation to enhance or otherwise improve the recovery of hydrocarbons therefrom.

It is another object to provide a method for stimulating hydrocarbon production of a subterranean hydrocarbon-bearing formation by increasing the porosity and permeability of the formation by the in situ combustion of a fracturing mixture, whereby a much greater improvement in terms of incremental barrels per day of hydrocarbons produced can be realized.

It is a further object to utilize an in situ combustion whereby the attendant thermal effects induce increased fracturing of the hydrocarbon-bearing formation over that attained by conventional fracturing methods.

SUMMARY

This invention relates to a secondary recovery operation by subjecting a subterranean hydrocarbon-bearing formation, which has undergone a hydraulic fracturing operation, to an in situ combustion of the hydraulic fracturing mixture in the additional channels so formed, and thereafter injecting water into the formation to induce further additional fractures by thermal shock.

DESCRIPTION OF THE METHOD

More specifically, it has been found that in tests involving the development of ignition systems for the initiation of in situ combustion, temperatures in excess of 2,000° F. have been attained in the formation adjacent a well bore by the use of a combustion hydrocarbon such as kerosene containing charcoal. Furthermore, subsequent examination of the formation matrix has shown that the accompanying high temperatures have resulted in the formation being irreversibly altered as manifested by increases in its permeability and porosity.

In the application of this invention, there is introduced into a subterranean formation, via a well penetrating the formation, a fracturing mixture consisting of a combustible hydrocarbon fluid such as kerosene, a particulate propping agent such as sand, and finely dispersed charcoal. After a conventional fracturing operation has been conducted by well-known techniques to the point where fracturing has occurred as indicated by a pressure decline and the mixture has been displaced into the formation, the mixture is ignited within the formation immediately adjacent the well bore by any techniques known in the art, such as electrical heating devices or chemical methods. However, the preferred igniter is an incendiary device, such as a charcoal package saturated with kerosene, which would be positioned across the hydrocarbon-bearing formation and then ignited using initiators such as electrical squibs or chemical fuses, during which time air would be injected in the well bore.

After ignition had been initiated, air would continue to be injected to maintain the combustion, and to continue the combustion of the hydraulic fracturing mixture. After in situ combustion of the hydraulic mixture had been completed, injection of the air would be terminated, and an aqueous medium, such as water or brine, would be introduced into the formation via the well bore to subject the hot zone swept by the in situ combustion to thermal shock thereby leading to additional fracturing of the formation.

While we do not wish to be bound by any particular theory, it is postulated that as a result of the in situ combustion, the physical characteristics of the formation swept by the high temperature will exhibit improved porosity and permeability. It is believe also that the high temperature will cause clays subjected thereto to lose water and become otherwise irreversibly dehydrated with resultant volume shrinkage. It is believed also that thermal fracturing of the formation swept or otherwise influence by the high temperature will occur by shear expansion along formation discontinuities. Further, it is believed that at the high temperature generated by the in situ combustion will effect calcination or thermal decomposition of many of the minerals present, such as limestone or dolomite, which were exposed to these high temperatures.

Illustrative of this invention, a mixture containing 50,000 pounds of sand and 50,000 pounds of charcoal admixed with 3,500 barrels of kerosene is used for fracturing. A conventional hydraulic fracturing operation is conducted whereby formation fractures are induced in the vicinity of the well bore. Ignition of the fracturing mixture is then accomplished by use of an incendiary charge positioned across the hydrocarbon-bearing formation. Air is injected continuously to continue the combustion of the fracturing mixture, thereby generating about 20,000 MMB.t.u. For an estimated air requirement of 190 MMc.f., approximately 30 to 40 days would be required for the in situ combustion operation. Following combustion of the fracturing mixture, water or brine is injected to quench the combustion, rapidly cool the heated formation, and thereby induce additional fracturing of the formation by thermal shock. Thereafter, the well would be produced to recover additional hydrocarbons.

It will be apparent from the foregoing description that the method is subject to other modifications without departing from the scope of the invention as defined in the following claims.

We claim:

1. In a method of treating a subterranean hydrocarbon-bearing formation penetrated by a well bore via which a combustible hydraulic fracturing mixture has been injected into said formation with resultant hydraulic fracturing thereof, the improvement comprising the steps of
   a. introducing via said well bore a combustion-supporting gas into that portion of said formation containing said hydraulic fracturing mixture,
   b. initiating in situ combustion of said hydraulic fracturing mixture within said formation,
   c. continuing combustion of said hydraulic fracturing mixture until temperatures in excess of 2,000° F. have been attained in the formation adjacent the well bore,
   d. discontinuing introducing said combustion-supporting gas into said formation to terminate said in situ combustion process,
   e. introducing via said well bore an aqueous media into that portion of said formation wherein said in situ combustion has occurred to effect a thermal quench of said formation with resultant additional fracturing of said formation by thermal shock and thereafter,
   f. producing said hydrocarbon via said well bore from said formation.

2. The method as defined in claim 1 wherein said combustible hydraulic fracturing mixture consists of a liquid petroleum fraction containing therein a particulate propping agent, comprising in admixture therewith finely suspended charcoal.

3. The method of claim 2 wherein said aqueous media is water, brine and mixtures thereof.

4. The method of claim 3 wherein said combustion-supporting gas is air.

* * * * *